UNITED STATES PATENT OFFICE.

ROBERT B. SHEPARD, OF PITTSBURG, PENNSYLVANIA.

COMPOSITION OF MATTER FOR THE MANUFACTURE OF GLASS.

SPECIFICATION forming part of Letters Patent No. 285,436, dated September 25, 1883.

Application filed October 30, 1882. (No specimens.)

*To all whom it may concern:*

Be it known that I, ROBERT B. SHEPARD, a citizen of the United States, residing at Pittsburg, in the county of Allegheny and State of Pennsylvania, have invented and discovered a new and useful composition of matter for the manufacture of glass, of which the following is a specification.

A black shale found in the lower coal-measure, generally above No. 3 coal-vein, (Pennsylvania Geological Survey,) and elsewhere, one hundred parts; soda-ash, (carbonate soda,) ten parts; lime, (burned,) thirty parts; salt, (chloride sodium,) twelve parts; arsenic, one-fourth part. These ingredients, pulverized and intimately mixed, I melt and treat as in the ordinary process of glass-manufacture. The product is a very beautiful, strong, black glass, soft to work, and useful for all purposes for which glass is generally employed, not requiring the transmission of light.

I prefer the foregoing combination; but the shale may be used without soda-ash and with other fluxes and ingredients, or with these in other proportions, and the product will be the same or similar.

I am aware that the manufacture of black glass is old; but I believe that it has never before been made from the shale combined with the materials as above described. The advantage of my invention is the production of a superior quality of black glass at a cost much less than any ever before made.

What I claim, and desire to secure by Letters Patent, is—

A composition for making glass, consisting of the natural shale herein described, combined with soda-ash, lime, salt, and arsenic, in substantially the proportions set forth.

ROBT. B. SHEPARD.

Witnesses:
C. W. DREWES,
D. P. BERG.